INVENTORS.
HOWARD R. PRICE
CHARLES J. ADAMS, JR.
SIMON TAMNY
BY White & Haefliger
ATTORNEYS.

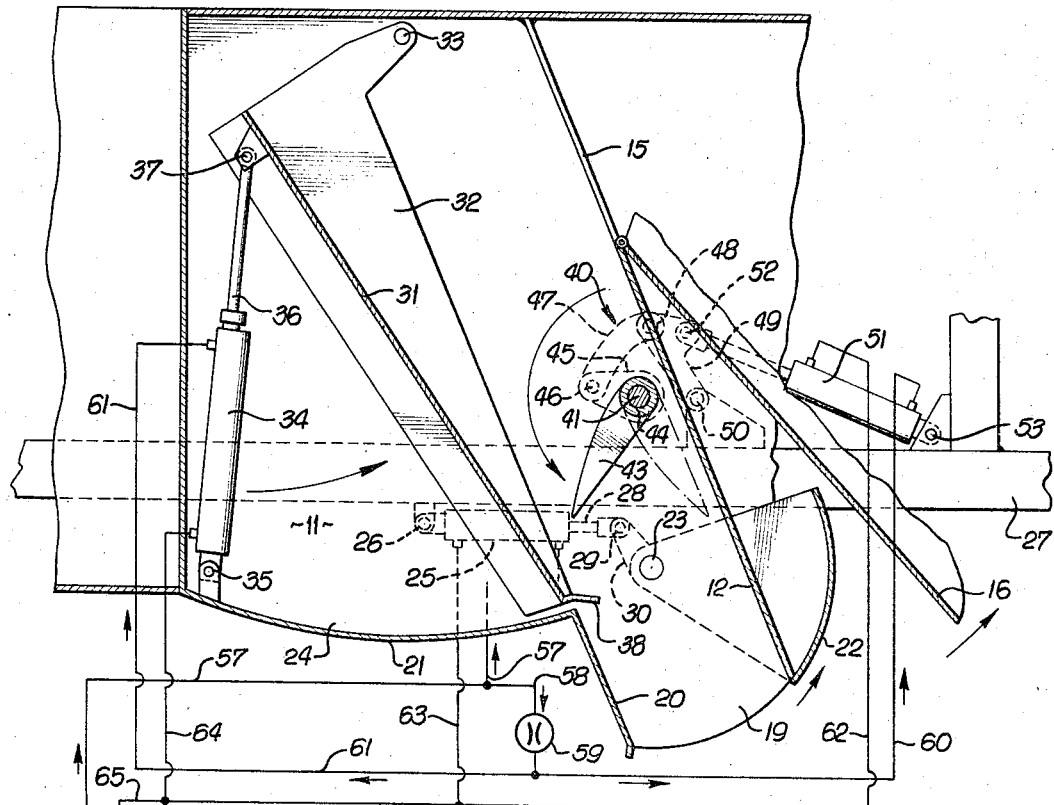
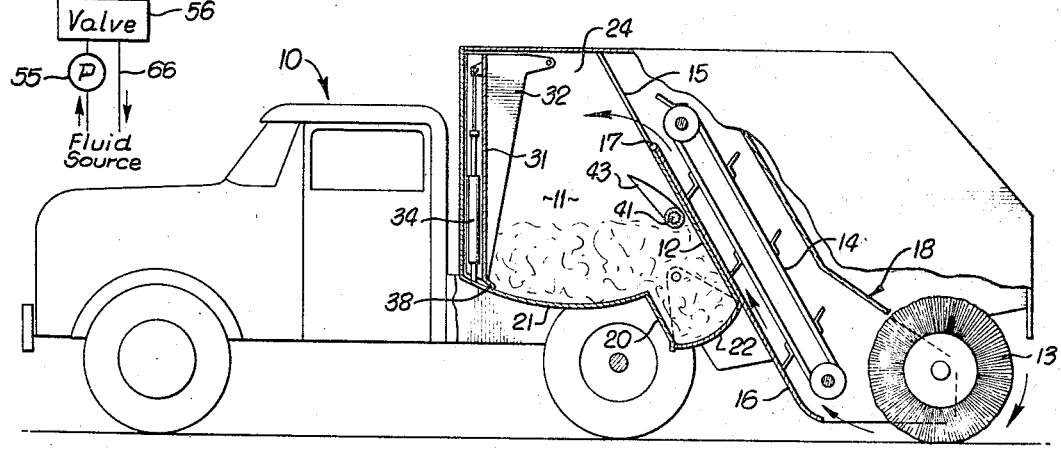

United States Patent Office 3,369,685
Patented Feb. 20, 1968

3,369,685
STREET SWEEPER HOPPER DUMP MECHANISM
Howard R. Price, Whittier, Charles J. Adams, Jr.,
Pomona, and Simon Tamny, Los Angeles, Calif.,
assignors to Wayne Manufacturing Company, Pomona, Calif., a corporation of California
Filed Dec. 21, 1965, Ser. No. 515,430
5 Claims. (Cl. 214—518)

ABSTRACT OF THE DISCLOSURE

The invention applies to street sweeper hopper and dump mechanism combinations wherein the hopper has an inclined wall overlying an operable debris discharge opening and at the outside of which broom swept debris is elevated into the hopper interior between the inclined wall and a pivoted pusher plate actuable to displace the debris to the outlet. Provided in conjunction with the pusher plate is a mechanism underlying the inclined wall and operable to positively displace the debris downwardly through the discharge opening when its closure is released in advance of the debris displacement.

---

This invention has to do generally with street sweepers of the general type comprising a debris chamber into which dirt swept from the road surface by a rotary broom is elevated by an inclined conveyor. More particularly, the invention is directed to improvements in conjunction with the debris chamber for facilitating and assuring complete dumping of its contents.

In its structural environment the invention has association with a debris chamber having at one side a wall at the outside of which operates an inclined conveyor to elevate and discharge debris into the chamber. The latter is dumped through a reduced, normally closed outlet at or near the base of the aforesaid chamber wall.

The invention has for its general object to provide powered means operable within the chamber in the dual capacities of displacing the full debris load toward the dumping outlet, and of preventing clogging accumulations by positively displacing the debris downwardly and through the outlet.

In one of its more particular aspects, the invention has for its object to provide a simple and effective powered means positioned and operating at an inclined wall side of the collection chamber to assure displacement of the debris through the outlet.

In its preferred form, the invention provides for mounting such means in proximate relation to the inclined chamber wall so that as the body of debris is pushed to that side of the chamber, the debris is acted upon at a location in direct overlying relation to the outlet and thereby is assured of complete discharge from the chamber.

Functionally, the invention has as a further object the provision of a control system capable of causing actuation of an outlet closure, bodily displacement of the debris load, and actuation of the outlet discharge means, all in predeterminable sequence. Specifically contemplated is a fluid pressure system operable to initially open the outlet closure and thereafter to fully actuate the load pusher and outlet discharge mechanisms.

The invention will be more fully understood from the following detailed description of an illustrative embodiment shown by the accompanying drawings, in which:

FIG. 3 is a view similar to FIG. 1 showing the dumping mechanisms in changed position; and FIG. 4 is a view, partly in section, illustrative of a street sweeper embodying the invention.

Figure 1:
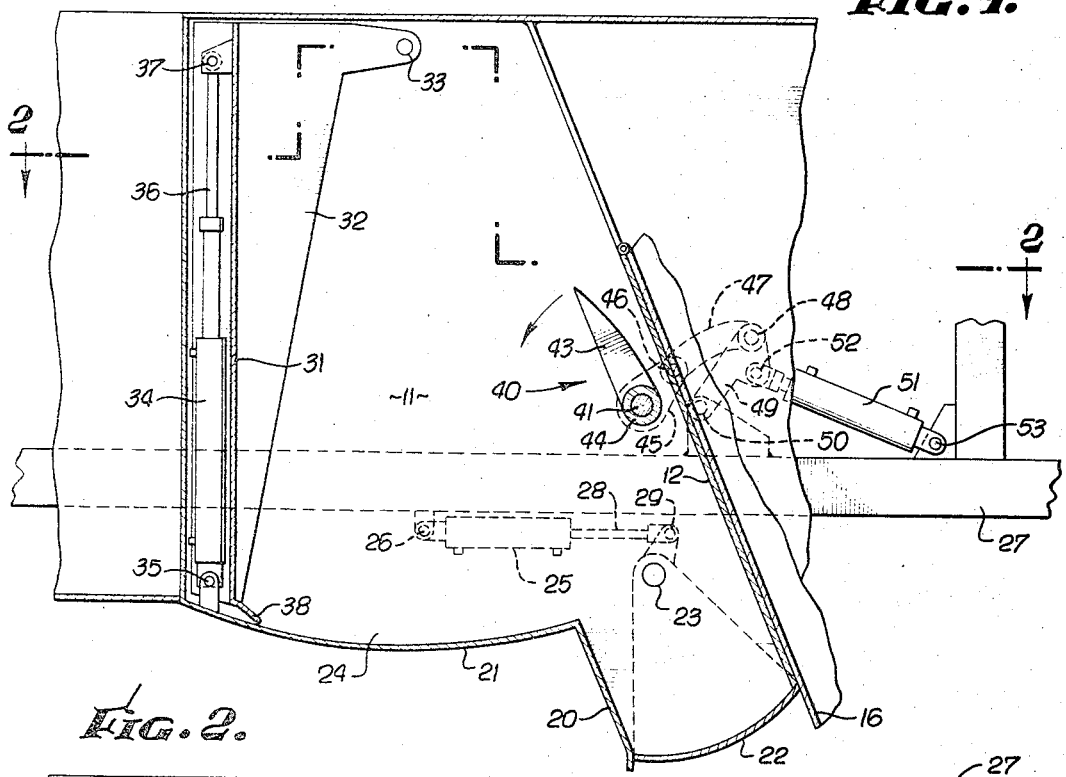
FIG. 1 is a fragmentary sectional view of the debris chamber and associated dumping mechanisms, as more generally shown in FIG. 4.
Figure 2:
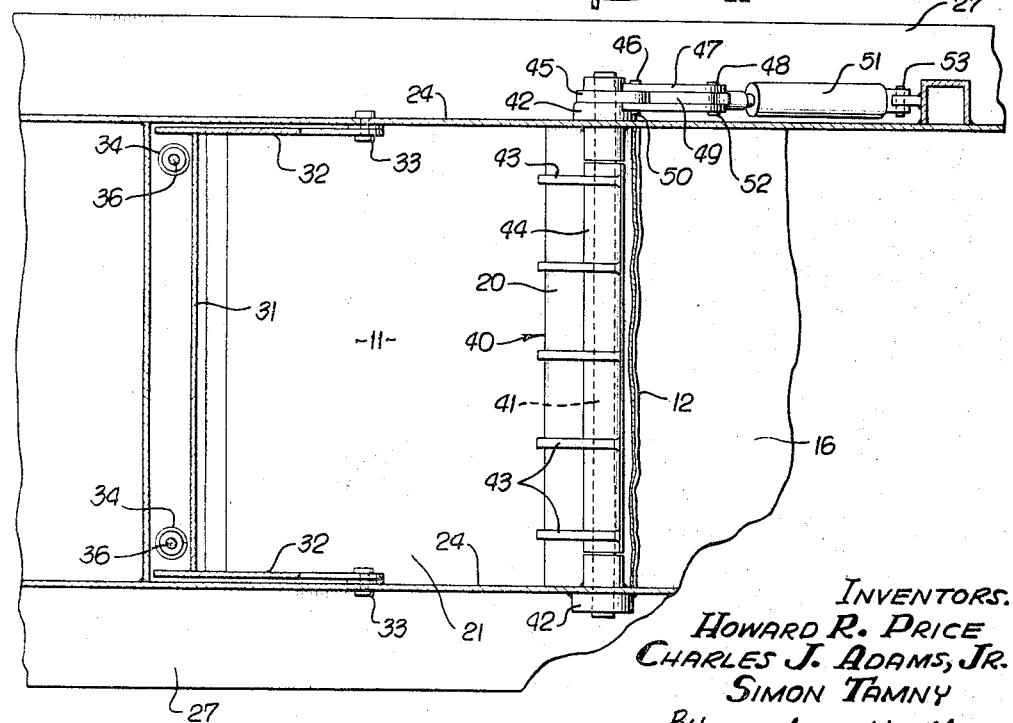
FIG. 2 is a broken plan section taken on line 2—2 of FIG. 1.

Referring first to FIG. 4, the sweeper there illustrated is of a conventional type to the extent of comprising a vehicle generally indicated at 10 having a dirt box or debris chamber 11 defined at one side by an inclined wall 12, the sweeper having the usual rotary broom 13, sweepings from which are taken by an inclined conveyor 14 at the outside of the wall 12 and elevated therealong to be discharged through opening 15 into the chamber 11. As is conventional in sweepers of the general design illustrated, the conveyor 14 is associated with a plate 16 pivoted at 17 to the fixed wall 12, and the conveyor, plate and the sweeper broom 13 are so related and mounted as by the structure generally indicated at 18, as to be capable of upward swinging movement as an assembly, under the influence of a power source (not shown) as usually employed, thereby to elevate the broom for non-sweeping travel of the vehicle and to swing plate 16 upwardly to the FIG. 3 position.

The chamber dumps through a bottom reduced outlet 19 defined by a wall 20 generally paralleling the inclined wall 12 at the corresponding side of the curved chamber bottom 21. The outlet 19 normally is closed by a gate or door 22 pivoted at 23 to the chamber sides 24 and operated to swing between the closed and open FIG. 1, FIG. 3 positions by hydraulic cylinder 25 pivoted at 26 to the sweeper vehicle frame 27 and having a piston rod 28 pivoted at 29 to the door arm 30. With plate 16 swung to the FIG. 3 position, the resulting clearance of the plate from wall 12 permits opening of the closure toward and in underlying relation to the plate 16.

The invention is more directly concerned with means for effecting and assuring complete dumping of debris from the chamber 11 by a combination of effects whereby after opening of the closure the debris is bodily displaced toward the dumping side of the chamber, and is acted upon at a location in alignment with or overlying relation to the outlet 19, to positively force the debris downwardly therethrough.

The aforesaid bodily displacement of the debris mass may be suitably accomplished by a pusher plate 31 extending transversely between the chamber walls 24 and having flanged sides 32 pivoted at 33 to mount the plate for swinging movement between the normal load receiving position of FIG. 1 and the extreme dumping position of FIG. 3. The pusher 31 is shown to be actuated by hydraulic cylinders 34 pivoted at 35 to the chamber bottom and having a piston rod 36 pivoted at 37 to the plate 31. The latter is shown to have a bottom flange 38 which becomes projected to or into the outlet 19 in the full dumping position of the pusher.

Because of compression toward and against the wall 12, the debris may tend to pack to the extent of being unable to fall freely through the outlet 19. To assure complete expulsion of the debris we provide mechanism generally indicated at 40, which is so mounted and operated as to positively displace the debris downwardly and in alignment with the outlet. The mechanism 40 is shown to comprise an oscillatory shaft 41 extending across the chamber 11 in underlying relation to the plane of the wall 12 and journaled in bearings 42 carried by the chamber sides 24. The shaft 41 mounts a series of arms or tines 43 projecting from sleeve 44 fixed to the shaft for oscillation therewith. The shaft carries outside one of the walls 24 an arm 45 pivoted at 46 to a link 47 which in turn pivots at 48 with lever 49 pivoted at 50 to the sweeper frame. Arm 49 is actuated by hydraulic cylinder 51 whose piston is pivoted to the arm at 52. At its opposite end the cylinder is pivoted at 53 to the frame 27.

In the dumping operation, cylinder 25 is actuated to open the dump gate 22, and cylinders 34 are actuated to progressively displace the pusher 31 toward the full dumping position of FIG. 3. As debris compresses and may tend to pack between the pusher plate and wall 12, cylinder 51 is actuated to singly or repeatedly swing the tines 43 between the FIG. 1 and FIG. 3 positions, thus to positively displace the debris downwardly through the open outlet 19.

FIG. 3 illustrates diagrammatically a control system for operating the outlet closure 22, pusher plate 31 and the mechanism 40 in predetermined sequence. Pump 55 to which hydraulic fluid is supplied from a suitable source or reservoir, is suitably controlled for purposes of actuating the described mechanisms, as by a conventional four-way valve diagrammatically indicated at 56, the fluid from which is delivered through pressure line 57 to cylinder 25 and through line 58 past a valvular or other suitable restriction 59, through lines 60 and 61 respectively to the cylinders 51 and 34. Return fluid flow, occurring upon actuation of the valve 56, passes from the cylinders 51, 25 and 34 respectively by way of lines 62, 63 and 64, all connecting with line 65 communicable through the four-way valve with line 66 leading to the fluid supply source.

In the dumping operation, plate 16 is swung upwardly and valve 56 is positioned to discharge pressurized fluid through line 57 unrestrictedly to the cylinder 25 so that opening of the closure 22 occurs first, thus clearing the outlet 19 for debris discharge. By virtue of the restriction at 59, the pressure fluid has delayed effective delivery to cylinders 34 and 51 so that after the outlet is cleared, the pusher 31 is operated to bodily displace the debris and the tines 43 are swung down ultimately to the broken line position of FIG. 3 to positively displace any outlet clogging accumulations. If necessary, the actuation system may be recycled by throwing the four-way valve to reversely pressurize the three actuating cylinders, thereby to return the parts to their starting positions, and the described dumping sequence may be repeated.

We claim:

1. In a street sweeper, means forming a debris chamber having at one side thereof an inclined wall and a reduced dumping outlet underlying said wall, conveyor means operable at the outside of said wall to elevate debris into the chamber, a pusher plate within the chamber opposite said wall and spaced therefrom to provide for debris reception between the plate and wall, means mounting said plate for swinging movement of its lower extent to displace debris from within the chamber toward said wall and outlet, and powered means mounted within the chamber in underlying relation to said wall and operable to displace the debris downwardly through said outlet.

2. A sweeper according to claim 1, comprising an openable closure for the bottom of said outlet and in which said outlet has the form of an inclined passage paralleling said wall.

3. A sweeper according to claim 1, in which said powered means comprises a shaft mounted proximate to said inclined wall and carrying a succession of tines, and means for oscillating the shaft to displace the debris.

4. A sweeper according to claim 1, including also an openable closure for said outlet, first, second and third actuators for moving respectively said pusher plate, powered means and closure, and means controlling the operation of said actuators in predetermined sequence to cause opening movement of said closure followed by movement of said plate and powered means.

5. A sweeper according to claim 4 in which said actuators comprise separate piston and cylinder units and connecting fluid lines and valve means for controllably pressurizing said units.

References Cited

UNITED STATES PATENTS

| 1,097,911 | 5/1914 | Brugger | 15—84 |
| 2,109,123 | 2/1938 | White et al. | 15—84 |
| 2,789,067 | 4/1957 | Link | 15—83 |
| 2,975,914 | 3/1961 | Clapsaddle | 214—83.14 |
| 3,176,884 | 4/1965 | Klouda | 214—83.18 |
| 3,189,200 | 6/1965 | Arnold | 214—83.22 |

GERALD M. FORLENZA, *Primary Examiner.*

ALBERT J. MAKAY, *Examiner.*